United States Patent
Papageorgiou et al.

(10) Patent No.: US 10,783,006 B2
(45) Date of Patent: Sep. 22, 2020

(54) METHOD AND SYSTEM FOR SUPPORTING STREAM PROCESSING FRAMEWORK FUNCTIONALITY

(71) Applicant: NEC Laboratories Europe GmbH, Heidelberg (DE)

(72) Inventors: Apostolos Papageorgiou, Heidelberg (DE); Bin Cheng, Sandhausen (DE)

(73) Assignee: NEC CORPORATION, Tokyo (JP)

( * ) Notice: Subject to any disclaimer, the term of this patent is extended or adjusted under 35 U.S.C. 154(b) by 223 days.

(21) Appl. No.: 16/071,486

(22) PCT Filed: Jan. 20, 2016

(86) PCT No.: PCT/EP2016/051105
§ 371 (c)(1),
(2) Date: Jul. 20, 2018

(87) PCT Pub. No.: WO2017/125146
PCT Pub. Date: Jul. 27, 2017

(65) Prior Publication Data
US 2019/0004864 A1 Jan. 3, 2019

(51) Int. Cl.
*G06F 9/50* (2006.01)
(52) U.S. Cl.
CPC .................................. *G06F 9/5066* (2013.01)
(58) Field of Classification Search
CPC .................... G06F 16/24568; G06F 9/5066
See application file for complete search history.

(56) References Cited

U.S. PATENT DOCUMENTS

| | | | |
|---|---|---|---|
| 2015/0103837 A1* | 4/2015 | Dutta | H04L 47/125 370/401 |
| 2016/0210061 A1* | 7/2016 | Soncodi | G06F 3/0605 |
| 2016/0344784 A1* | 11/2016 | Cao | H04L 43/026 |
| 2017/0083378 A1* | 3/2017 | Bishop | G06F 16/24568 |

OTHER PUBLICATIONS

Aniello et al., "Adaptive Online Scheduling in Storm" (Jun. 2013), Proceedings of the 7th ACM international conference on distributed event-based systems, pp. 207-218 [retrieved from https://dl.acm.org/doi/abs/10.1145/2488222.2488267].*

(Continued)

*Primary Examiner* — Brian W Wathen
(74) *Attorney, Agent, or Firm* — Leydig, Voit & Mayer, Ltd.

(57) ABSTRACT

A method for supporting stream processing framework functionality in a stream processing system, the stream processing system including one or more input modules, a stream processing platform, and computing nodes, includes deploying, by the stream processing platform using the input modules, tasks of at least one stream processing topology on the computing nodes based on both stream processing topology-related information and stream processing topology-external information. The method additionally includes preparing and executing, by the stream processing platform, the tasks of the at least one stream processing topology on the computing nodes.

20 Claims, 9 Drawing Sheets

(56) References Cited

OTHER PUBLICATIONS

Apostolos Papageorgiou, et al., "Edge-Computing-aware Deployment of Stream Tasks based on Topology.external Information: Model, Algorithms, and a Storm-based Prototype", 2016 IEEE International Congress on Big Data (BigData Congress), Jun. 27-Jul. 2, 2016, pp. 1-8.
Prof Geoffrey et al: "Survey of Distributed Stream Processing for Large Stream Sources Supun Kamburugamuve for the PhD Qualifying Exam Dec. 14, 2013 Advisory Committee", Dec. 14, 2013 (Dec. 14, 2013), XP055216613, the whole document.
Xiufeng Liu et al: "Survey of real-time processing systems for big data", Jul. 7, 2014; Jul. 7, 2014-Jul. 9, 2014, Jul. 7, 2014 (Jul. 7, 2014), pp. 356-361, XP058054211.
Gianmarco De et al: "SAMOA: Scalable Advanced Massive Online Analysis", Journal of Machine Learning Research, vol. 16, Jan. 1, 2015 (Jan. 1, 2015), pp. 149-153, XP055295827.
Marek Rychly; Petr Koda; P. Smrz: "Scheduling decisions in stream processing o heterogeneous clusters; $8^{th}$ International Conference on Complex, Intelligent and Software Intensive Systems (CISIS)", Jul. 2-4, 2014, IEEE, XP002761931, pp. 614-619.

\* cited by examiner

```
{
  "edgeInteractions": {
    "edgeExecutionRequired": "no",
    "controlledActuators": [
      {
        "name": "actuator1",
        "type": "switch",
        "area": "area1",
        "geo": "coordinates",
        "latencyRequirement": "low/medium/high"
      },
      {
        "name": "actuatorX",
        "type": "switch",
        "area": "areaX",
        "geo": "coordinates",
        "latencyRequirement": "low/medium/high"
      }
    ],
    "provisionedIntermediateResults": [
      {
        "result": "res1",
        "access": "pubSub",
        "mainUsersArea": "area1",
        "mainUsersLayer": "edge/core/cloud",
        "latencyRequirement": "low/medium/high"
      },
      {
        "result": "resX",
        "access": "pubSub/pull",
        "mainUsersArea": "areaX",
        "mainUsersLayer": "edge/core/cloud",
        "latencyRequirement": "low/medium/high"
      }
    ],
    "potentiallyRaisedEvents": [
      {
        "event": "event1",
        "propagationArea": "area1",
        "propagationLayer": "edge/core/cloud",
        "latencyRequirement": "low/medium/high"
      },
      {
        "event": "eventX",
        "propagationArea": "areaX",
        "propagationLayer": "edge/core/cloud",
        "latencyRequirement": "low/medium/high"
      }
    ]
  },
  "editedDatabases": [
    {
      "name": "db1",
      "type": "rdbms",
      "area": "area1",
      "dbLayer": "edge/core/cloud",
      "mainUsersLayer": "edge/core/cloud",
      "latencyRequirement": "low/medium/high"
    },
    {
      "name": "dbX",
      "type": "rdbms/nosql",
      "area": "areaX",
      "dbLayer": "edge/core/cloud",
      "mainUsersLayer": "edge/core/cloud",
      "latencyRequirement": "low/medium/high"
    }
  ],
  "computationCharacteristics": {
    "cpuIntensity": "low/medium/high",
    "expectedDataIOIntensity": "low/medium/high",
    "forbiddenAreas": ["forbiddenArea1", "forbiddenArea2", "forbiddenAreaX"],
    "forbiddenLayers": ["forbiddenLayer1", "forbiddenLayer2", "forbiddenLayerX"],
    "forbiddenDomains": ["forbiddenDomain1", "forbiddenDomain2", "forbiddenDomainX"],
    "specificDevice": "targetDeviceName"
  }
}
```

Fig. 8

```
storm.zookeeper.servers:
    - "192.168.56.1"

nimbus.host: "192.168.56.1"

topology.metrics.consumer.register:
    - class: "storm.geelytics.GeelyticsUsageLogger"
      parallelism.hint: 1 storm.scheduler:
"storm.schedulers.geelytics.GeelyticsTestScheduler"

supervisor.scheduler.meta:
    nodeId: "node1"
    nodeArea: "area1"
    nodeDomain: "domain1"
    nodeLayer: "edge/core/cloud"
    nodeCpu: "XXX"
    nodeMemory: "XXX"
```

Fig. 9

METHOD AND SYSTEM FOR SUPPORTING STREAM PROCESSING FRAMEWORK FUNCTIONALITY

CROSS REFERENCE TO RELATED APPLICATIONS

This application is a U.S. National Stage Application under 35 U.S.C. § 371 of International Application No. PCT/EP2016/051105 filed on Jan. 20, 2016. The International Application was published in English on Jul. 27, 2017 as WO 2017/125146 A1 under PCT Article 21(2).

FIELD

The present invention relates to a method for supporting stream processing framework functionality in a stream processing system. Furthermore, the present invention relates to system for supporting stream processing framework functionality.

BACKGROUND

A stream processing framework (SPF) is a software solution that runs on parallel networked systems in order to facilitate and regulate the execution of applications comprising multiple data-intensive processing steps. These steps usually use the output of previous steps while they provide input to the next ones, so that the steps run sequentially or rather according to a graph.

In recent years SPFs have been developed and become widely used because of Big Data, i.e. data that is going into a system with very high incoming ratios or volumes and needs to be analyzed in various ways or steps "on the fly" before it is stored or even without being stored. The systems on which SPFs run are traditionally server clusters, but they can be any set of networked devices, i.e. the devices that form the cluster might be heterogeneous and physically distributed. The traditional scenario of server clusters stems from the fact that most Big Data streams were coming from Web analytics applications, while the latter scenario of running SPFs on heterogeneous and geo-distributed nodes is now motivated by the huge streams that can be produced and analyzed in the Internet of Things (IoT).

Different SPFs such as Apache Storm, S4, Spark, or Samza use different terminologies and slightly different architectures. However, from a high-level perspective most of them operate as shown in FIG. 1. Developers provide the sequence of the steps that needs to be executed, along with the implementation of each step and some required settings, e.g. desired number of instances for each step, desired number of used machines/devices, etc. to the SPF. Adhering to the terminology of Apache Storm, the sequence or rather the graph of steps is designated as "topology", the individual steps are designated as "components", and the devices are designated as "nodes". When the SPF has received the necessary input and the respective commands, the SPF can generate one or more instances of each component that are designated as "tasks" and can deploy them on nodes according to its internal logic, the settings, and/or the system state. The term "Deployment" may be understood as the combination of "parallelization" (i.e. number of instances/tasks pro component), "allocation" (i.e. which task goes to which node), and "grouping" (i.e. to which instance(s) of the "next" component does the output of a task go).

Because the requirements of heterogeneous and geo-distributed systems are different than those of server clusters, researchers and SPF developers have contributed systems and methods for extending SPFs in ways that better serve the "heterogeneous" scenario. More concretely, they have specified additional inputs such as descriptions of network link or node capabilities, additional SPF modules such as attached system monitors or sophisticated schedulers, and different server cluster types, as well as the algorithms that exploit these add-ons.

For example, the non-patent literature of Leonardo Aniello, Roberto Baldoni, and Leonardo Querzoni: "*Adaptive Online Scheduling in Storm*". *7th ACM International Conference on Distributed Event-Based Systems*, pages 207-218, ACM, 2013 and the non-patent literature of Valeria Cardellini, Vincenzo Grassi, Francesco Lo Presti, and Matteo Nardelli: "*Distributed QoS-aware Scheduling in Storm*", *9th ACM International Conference on Distributed Event-Based Systems*, pages 344-347, ACM, 2015 describe an extension of Apache Storm for taking CPU and network load between the servers into account in order to rebalance the allocation of tasks to nodes, while the non-patent literature of Marek Rychly, Petr Koda, and P. Smrz: "*Scheduling decisions in stream processing on heterogeneous clusters*", $8^{th}$ *International Conference on Complex. Intelligent and Software Intensive Systems* (*CISIS*), pages 614-619, IEEE, 2014 refers to a similar solution but based on design-time knowledge about nodes, as well as performance tests.

SUMMARY

In an embodiment, the present invention provides a method for supporting stream processing framework functionality in a stream processing system, the stream processing system including one or more input modules, a stream processing platform, and computing nodes. The method includes deploying, by the stream processing platform using the input modules, tasks of at least one stream processing topology on the computing nodes based on both stream processing topology-related information and stream processing topology-external information, and preparing and executing, by the stream processing platform using the input modules, the tasks of the at least one stream processing topology on the computing nodes.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 8 is a component configuration template for providing parts of Edge Computing Settings (ES) and System Topologies (ST) descriptors according to an embodiment of the present invention, and FIG. 9 is a node-wide Apache Storm configuration for providing parts of Edge Computing Settings (ES) and System Topologies (ST) descriptors according to an embodiment of the present invention.

DETAILED DESCRIPTION

Figure 1:
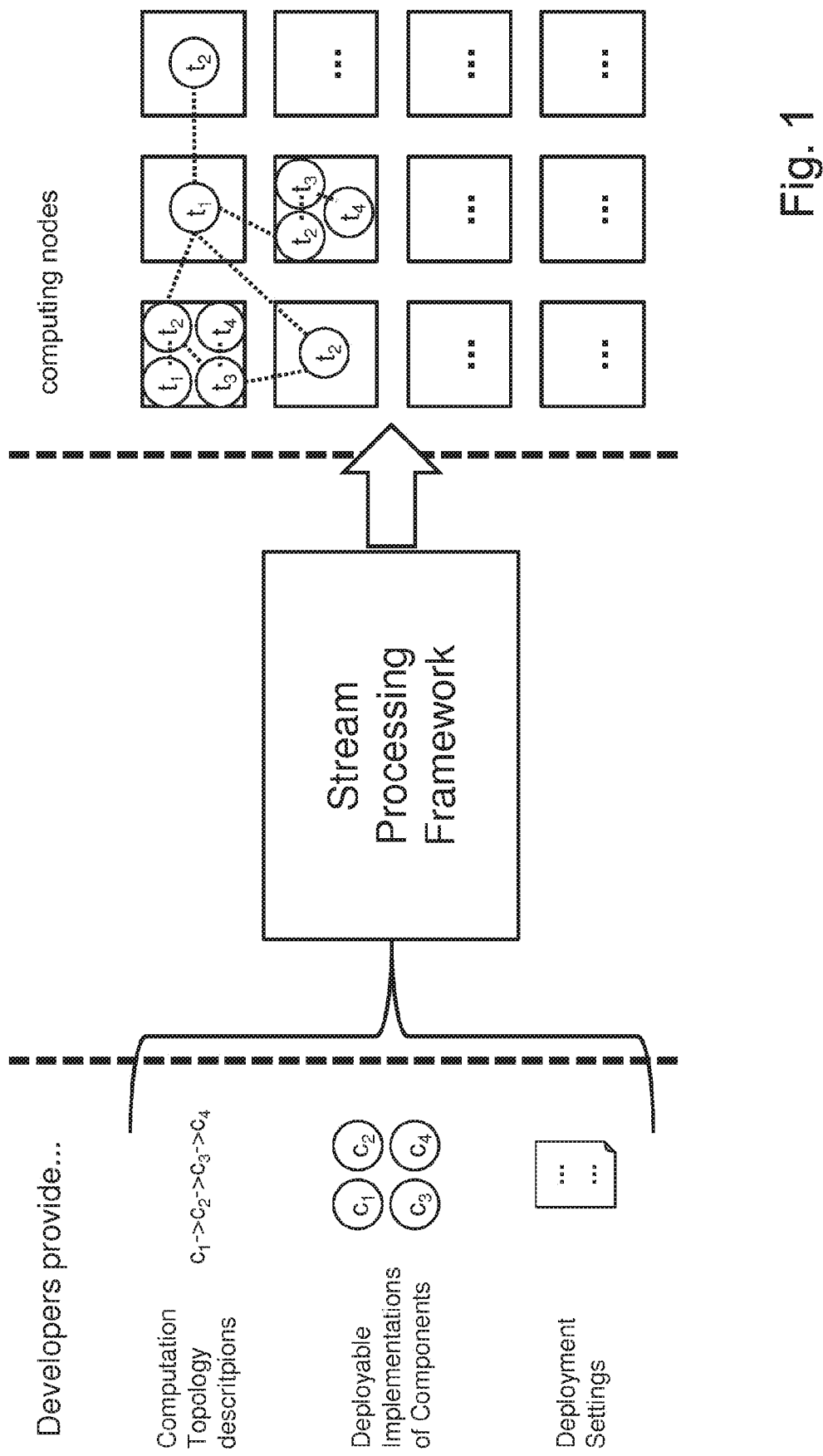
FIG. 1 is a schematic view illustrating a basic SPF functionality in a simple application scenario with a server cluster.

Conventional methods and systems for supporting stream processing framework functionality have the following problem: when the internal logic of the components or the usage of the system—not only in terms of load and performance but also with regard to functional aspects—require an application-specific deployment of tasks, no solution is provided by which the SPF deploys the tasks where they actually should be.

Embodiments of the present invention provide methods and systems for supporting stream processing framework functionality in such a way that the deployment of tasks on distributed computing nodes is improved.

According to an embodiment of the invention, methods are provided for supporting stream processing framework functionality in a stream processing system, wherein the system comprises one or more input modules, a stream processing platform and computing nodes, wherein said stream processing platform uses said input modules in order to prepare, deploy and execute tasks of at least one stream processing topology on the computing nodes, wherein the tasks are deployed on the computing nodes based on both stream processing topology-related information and stream processing topology-external information.

Furthermore, according to embodiments of the invention, systems are provided for supporting stream processing framework functionality, the systems comprising one or more input modules, a stream processing platform and computing nodes, wherein said stream processing platform uses said input modules in order to prepare, deploy and execute tasks of at least one stream processing topology on the computing nodes, wherein the system is configured to deploy the tasks on the computing nodes based on both topology-related information and topology-external information.

According to the invention, it has first been recognized that, for example, the following use cases for components of a topology cannot be managed or cannot be managed sufficiently by traditional methods or systems according to the known state of the art:

A component activates actuators or raises alarms with unknown frequencies and varying latency requirements: For example, you might prefer to have a fault detection task which analyzes inputs from factory equipment running in the Cloud if you just want to store analysis results, but you might prefer to have it running on an on-premises gateway if it urgently switches off a machine upon fault detection. This is because in the latter case the reaction can be faster and these milliseconds for switching off the machine might be critical.

A component writes data into databases that might be accessed in different areas or by different kinds of users: For example, you might have a sensor-reading and analysis task that sometimes writes data into a local database (e.g. at a company building) that is accessed directly by user (e.g. employee) smartphones and sometimes writes data into a remote server database that is used for presentation on a website. Depending on which of the two happens more frequently, you might prefer to have the task running either on-premises or at the backend.

A component has time-critical or mission-critical interactions with other modules or entities, which are potentially not part of the topology: For example, a face detection task might be preferably run close to the surveillance camera if it urgently increases the camera resolution upon detection of many faces or it can also be run in the Cloud otherwise, if bandwidth is also not an issue.

Thus, according to the invention, it has been recognized that deploying the tasks based only on topology settings and network characteristics as done in traditional state-of-the-art approaches would not achieve a desired and/or optimal deployment in such scenarios. The above mentioned scenarios are irrelevant to the stream topology traffic and would not be handled by the traditional approaches. Further, it has been recognized that an enormous improvement can be achieved if topology-external information is involved and considered in the deployment of tasks of a topology onto distributed networked computing nodes. Specifically, according to the invention a stream processing system comprises one or more input modules, a stream processing platform and computing nodes. The stream processing platform uses the input modules in order to prepare, deploy and execute tasks of one or more stream processing topologies on the computing nodes. In this regard, the tasks of a topology are deployed on the computing nodes based on both stream processing topology-related information and stream processing topology-external information. Thus, if required, edge computing might be enabled advantageously by considering topology-external information such as topology-external system characteristics. The deployment of the tasks may be performed by optimizing the fulfillment of requirements derived from the topology-related information and/or derived from the topology-external information. Thus, the deployment of tasks on distributed computing nodes is considerably improved.

At least one embodiment of the invention may have at least one of the following advantages: achieving lower latencies for certain use cases that may have respectively strict requirements; achieving lower total bandwidth consumption in use cases where the edge nodes can host many tasks without impacting system performance; achieving a better average resource utilization in heterogeneous networks;

The term "stream processing topology" or "topology" can be used herein to refer to a sequence or a graph of steps. The steps may be designated as components, wherein a running instance of a component may be designated as a task. Thus, a "stream processing topology" comprises tasks when the stream processing topology is deployed and executed on computing nodes of a server cluster or of any other kind of system comprising networked computing nodes. For example, further explanations to the term topology may be obtained from the non-patent literature of Leonardo Aniello, Roberto Baldoni, and Leonardo Querzoni: *"Adaptive Online Scheduling in Storm"*, 7th ACM International Conference on Distributed Event-Based Systems, pages 207-218, ACM, 2013.

According to embodiments of the invention, the topology-related information may include stream processing topology settings such as a predetermined number of instances for each component of a topology, computational characteristics of components of the topology and/or a predetermined number of computing nodes to be used for the execution. Furthermore, topology-related information may include system characteristics, network link characteristics and/or computing node characteristics such as layer, location, domain, capabilities, etc. of the computing nodes. Thus, standard SPF-required settings and capabilities of network links and/or network nodes can be involved suitably and advantageously in the deployment of the tasks.

According to embodiments of the invention, the topology-external information may include information on interactions between the tasks of a topology and topology-external entities. Topology-external entities may be entities or system participants different to or other than the computing nodes of the stream processing system. Thus, the performance of the execution of tasks may be further improved.

Furthermore, the computation-related and latency-related characteristics and requirements of the interactions between the tasks and topology-external entities may be considered as topology-external information. Thus, the performance of the execution of tasks may be further improved.

According to embodiments of the invention, the topology-external information may include information about characteristics and/or requirements of topology-external entities. Thus, the performance of the execution of tasks may be further improved.

According to embodiments of the invention, the characteristics and/or requirements of the topology-external entities may be or may concern layer, location, domain and/or capabilities of the topology-external entities. Thus, the performance of the execution of tasks may be further improved.

According to embodiments of the invention, the topology-external entities may be data sources, databases, actuators, external client systems and/or users. Thus, the flexibility of deploying the tasks is increased.

According to embodiments of the invention, edge computing requirements may be involved in the deployment of the tasks on the computing nodes, wherein the edge computing requirements are considered by implementing edge computing descriptors that comprise at least one of the following categories of characteristics: interfaces of a task with topology-external entities, e.g. control of actuators, direct provision of intermediate results to users and/or event- or alarm-raising; characteristics of a database with which a task interacts; computational characteristics of a task, in particular CPU-intensity, data-intensity and/or security restrictions of a task.

Thus, it may be determined if a task is relevant to network edge computing and should be executed at the edge or not.

According to embodiments of the invention, it may be provided that backward interaction is performed from the tasks to the stream processing platform in order to communicate information about task internal logic and/or task topology-external usage. Thus, the status of interactions between tasks and topology-external entities such as actuators, databases, users and/or client systems can be monitored and involved in the deployment of the tasks.

According to embodiments of the invention, usage events related to task topology-external usage may be reported back by the tasks to the stream processing platform, wherein the usage events comprise at least one of number and/or types of interactions with an actuator that occur within a predetermined time interval; number and/or types of database transactions that occur within a predetermined time interval; probability of topology termination based on task executions within a predetermined time interval (this metric may actually show the ratio with which incoming stream items do not lead to any outgoing stream and it can be important when deciding where to execute the tasks).

Thus, it is considered that the existence of usage events and the utilization of time interval are important in stream processing systems, because not every single interaction can be separately reported or centrally monitored by the stream processing platform.

According to embodiments of the invention, it may be provided that a re-deployment decision algorithm is performed in order to determine if a current deployment of running tasks is improvable, wherein the re-deployment decision algorithm may comprise the steps of: comparing the current deployment of the tasks with a predetermined optimal deployment of the tasks; determining deployed tasks having different placements in these two compared deployments; determining violations of one or more predefined requirements, wherein the violations are produced by the placements of the deployed tasks in the current deployment determined in the previous step.

Thus, it may be determined if a deployment optimization algorithm should be executed in order to de-deploy the topology or rather their tasks. By doing this, the performance can be improved. Furthermore, the redeployment decision algorithm may run periodically.

In order to implement the optimization algorithm, a decision module may be used to decide during operation when task re-deployment should be performed. Furthermore, a scheduler may be triggered to re-allocate tasks to computing nodes based on the system usage and/or updated requirements.

According to embodiments of the invention, a re-deployment of running tasks may be triggered and performed dependent on the extent/amount of the determined violations. Thus, a simple and effective implementation for performance improvement is provided.

According to embodiments of the invention, a re-deployment of running tasks may be triggered and performed if the amount of the determined violations is higher than a predefined threshold, for example if the number of the determined violations is higher than a predefined threshold. Thus, a simple and effective implementation for performance improvement is provided.

According to embodiments of the invention, it may be provided that the determined violations are classified in several categories, wherein the determined violations of each category are compared with a predefined threshold for each category in order to determine if the total violation of all categories is high enough to justify the triggering of a re-deployment of running tasks. Thus, a more flexible, more finely graduated and/or more complex decision making can be implemented. Thus, a flexible and effective implementation for performance improvement is provided.

According to embodiments of the invention, the topology-external information may be consolidated by a combination of edge computing descriptors and usage events. The edge computing descriptors may be defined by a developer. The usage events may be computed by a monitoring system based on case-specifically defined metrics. The method and the system may be enabled by a system extension of a typical SPF (e.g. as defined in the introduction of this document) which incorporates additional platform modules, topology/system usage description structures, and task deployment and execution algorithms.

FIG. 1 is a schematic view illustrating a basic stream processing framework (SPF) functionality in a simple application scenario with a server cluster. Different SPFs such as Apache Storm, S4, Spark, or Samza use different terminologies and slightly different architectures. However, from a high-level perspective most of them operate as shown in FIG. 1. Developers provide the sequence of the steps that needs to be executed, along with the implementation of each step and some required settings (e.g. desired number of instances for each step, desired number of used machines/devices, etc.) to the SPF. Adhering to the terminology of Apache Storm, the sequence or rather the graph of steps is designated as "topology", the individual steps are designated as "components", and the devices are designated as "nodes".

Thus, as depicted in FIG. 1, developers provide computation topology descriptions, deployable implementations of components and deployment settings as input for the SPF. The SPF deploys the tasks onto the computing nodes of the server cluster.

Specifically, when the SPF has received the necessary input and the respective commands, the SPF can generate one or more instances of each component that are designated as "tasks" and can deploy them on the computing nodes according to its internal logic, the settings, and/or the system state. "Deployment" may be defined as the combination of "parallelization" (i.e., number of instances/tasks per component), "allocation" (i.e. which task goes to which node), and "grouping" (i.e. to which instance(s) of the "next" component does the output of a task go).

Figure 2:
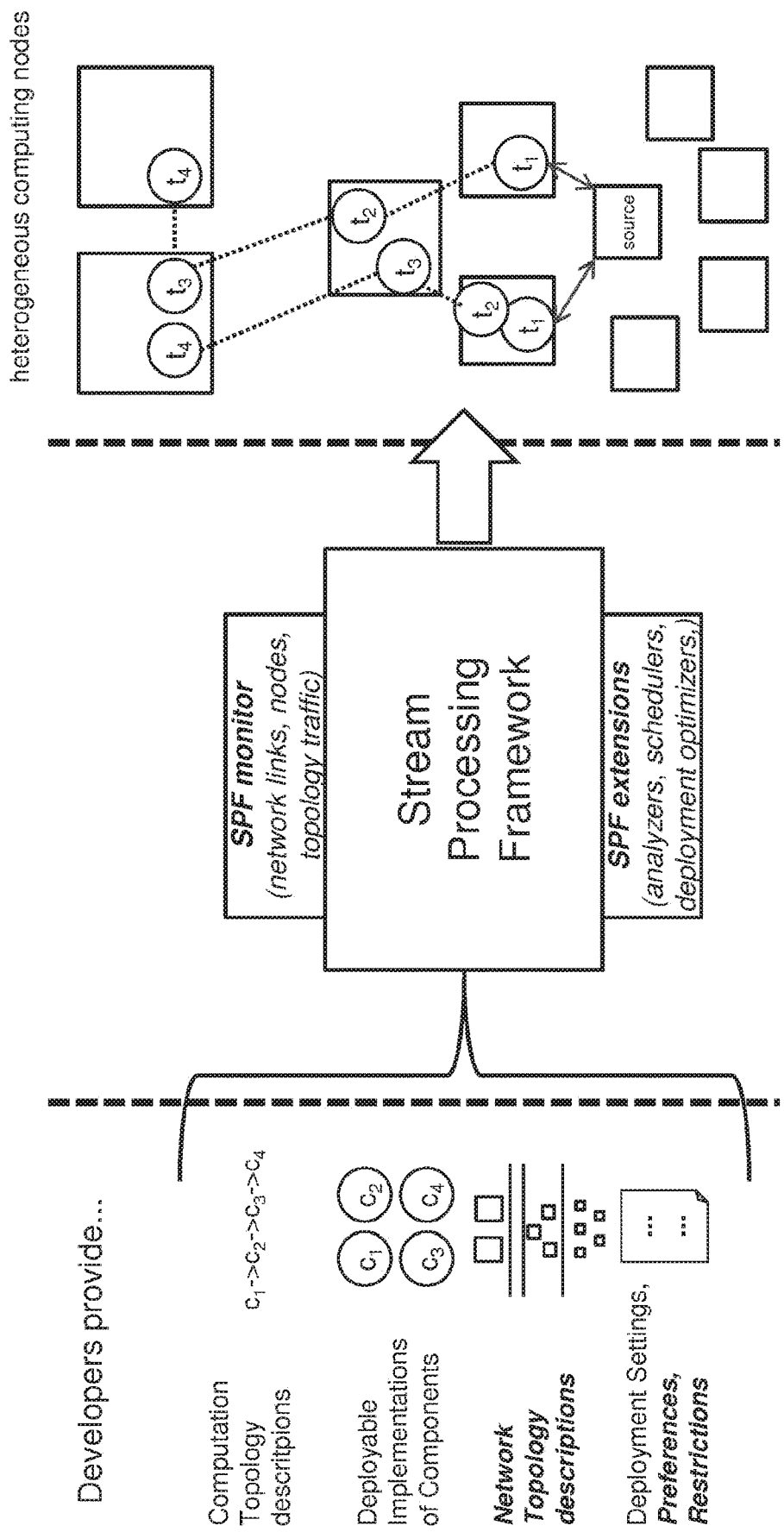
FIG. 2 is a schematic view illustrating SPF functionality with exemplary extensions for an application scenario with heterogeneous nodes.

Standard SPFs were originally designed for performing stream processing in the Cloud. However, in terms of task allocation and execution, standard SPFs ignore:
  node heterogeneity
  geo-distributed nature of IoT (Internet of Things) data sources
  special data traffic and delay requirements
  criticality of certain sensors and actuators FIG. 2 is a schematic view illustrating SPF functionality with enhancements for an application scenario with heterogeneous computing nodes. Because the requirements of heterogeneous and geo-distributed systems are different than those of server clusters, researchers and SPF developers have contributed systems and methods for extending SPFs in ways that better serve the "heterogeneous" scenario. More concretely, they have specified additional inputs such as descriptions of network link or node capabilities, additional SPF modules such as attached system monitors or sophisticated schedulers, and different server cluster types, as well as the algorithms that exploit these add-ons.

For example, the non-patent literature of Leonardo Aniello, Roberto Baldoni, and Leonardo Querzoni: "*Adaptive Online Scheduling in Storm*", 7th ACM International Conference on Distributed Event-Based Systems, pages 207-218, ACM, 2013, and the non-patent literature of Valeria Cardellini, Vincenzo Grassi, Francesco Lo Presti, and Matteo Nardelli: "*Distributed QoS-aware Scheduling in Storm*", 9th ACM International Conference on Distributed Event-Based Systems, pages 344-347, ACM, 2015 describe an extension of Apache Storm for taking CPU and network load between the servers into account in order to rebalance the allocation of tasks to nodes, while the non-patent literature of Marek Rychly, Petr Koda and P. Smrz: "*Scheduling decisions in stream processing on heterogeneous clusters*", 8th *International Conference on Complex. Intelligent and Software Intensive Systems* (*CISIS*), pages 614-619, IEEE, 2014 refers to a similar solution but based on design-time knowledge about nodes, as well as performance tests.

As depicted in FIG. 2, developers provide computation topology descriptions, deployable implementations, network topology descriptions and deployment settings together with preferences and restrictions as input for the SPF. The SPF of FIG. 2 is equipped with a SPF monitor for monitoring network links, nodes and topology traffic. Furthermore, the SPF of FIG. 2 is equipped with SPF extensions such as analyzers, schedulers and/or deployment optimizers. The SPF deploys the tasks onto heterogeneous computing nodes.

Figure 3:
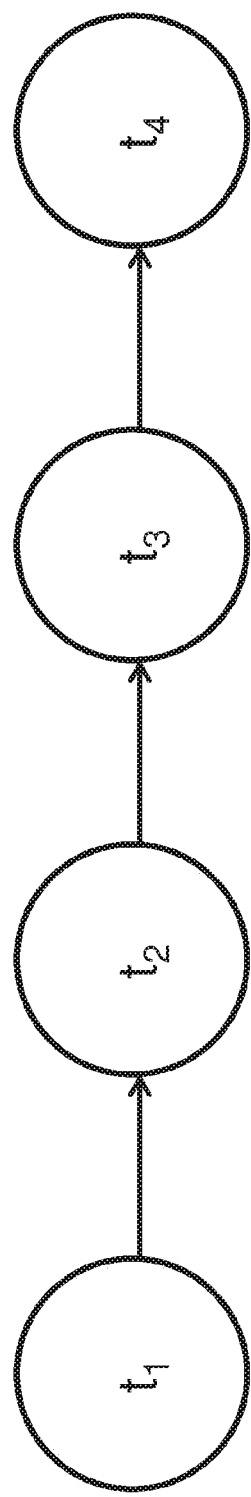
FIG. 3 is a schematic view illustrating a topology in the form of a directed acyclic graph of tasks as it may be considered by a SPF.

FIG. 3 shows a topology in the form of a directed acyclic graph of tasks as it may be considered by a SPF. Hence, SPFs such as Apache Storm may see topologies as a directed acyclic graph of components/tasks and distribute the instances that fulfill the tasks almost evenly among the nodes of the network.

Figure 4:
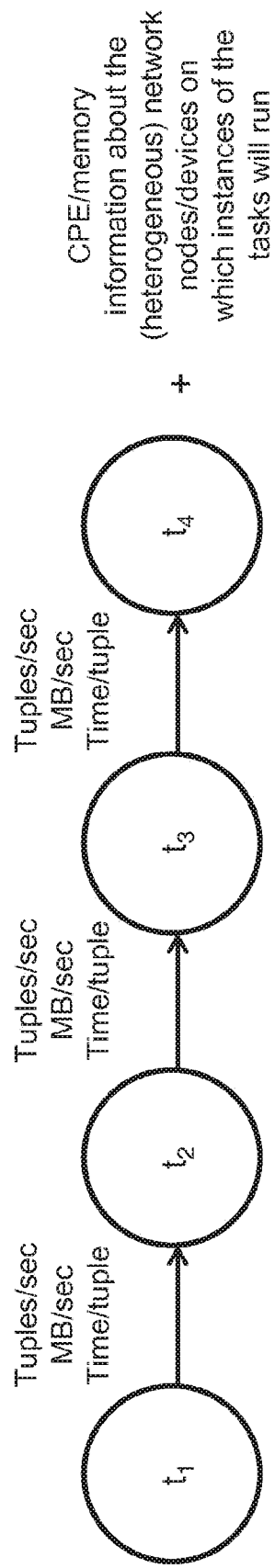
FIG. 4 is a schematic view illustrating a topology in the form of a directed acyclic graph of tasks together with additional information as it may be considered by a SPF.
Figure 5:
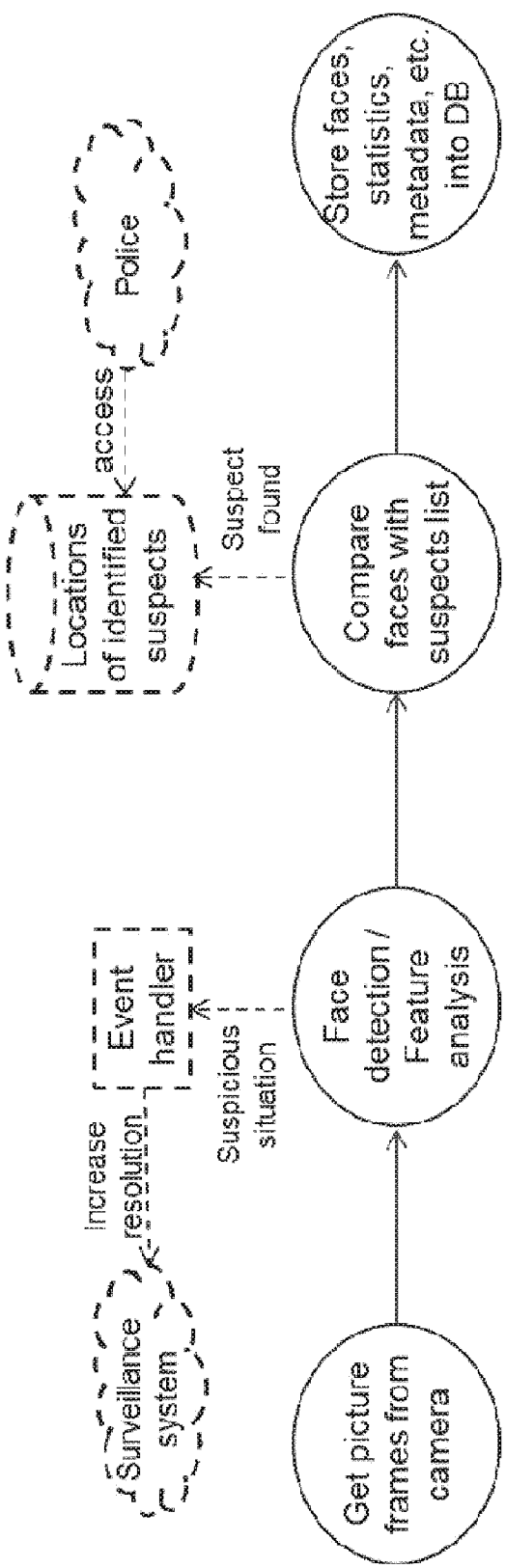
FIG. 5 is a schematic view illustrating an example stream where topology-external aspects may affect the necessity of performing edge computing.

FIG. 4 shows a topology in the form of a directed acyclic graph of components/tasks together with additional information as it may be considered by a SPF. The approach of FIG. 4 that attempts to adapt SPFs to the IoT (Internet of Things) may see additional information about the topologies. Thus, SPF extensions are provided which distribute the instances that fulfill the tasks in a way that optimizes performance based on: node CPU characteristics and inter-server network load; task communication cost (routing and processing) for possible placements; design-time knowledge about nodes and runtime performance test;

FIG. 5 shows an example stream where topology-external aspects may affect the necessity of performing edge computing. An embodiment of the present invention may consider the fact that streaming tasks might reach results or trigger actions independently of and externally to the topology traversal. Hence, FIG. 5 provides a concrete example where topology- and system-irrelevant aspects can affect the necessity (or not) of deploying the stream processing tasks on specific nodes (i.e. executing certain tasks close to data sources, databases (DB), users, or actuators). The example of FIG. 5 is a surveillance system workflow. In FIG. 5, the actual topology is represented at the lowest level, while all dashed elements above it show aspects that are not part of the known topology or network characteristics, but rather related to internal component logic, topology data usage, application environment, or similar. Hence, the lower part of FIG. 5 represents the topology-related system usage. The upper part of FIG. 5, i.e. the dashed elements, represents the topology-external system usage.

Figure 6:
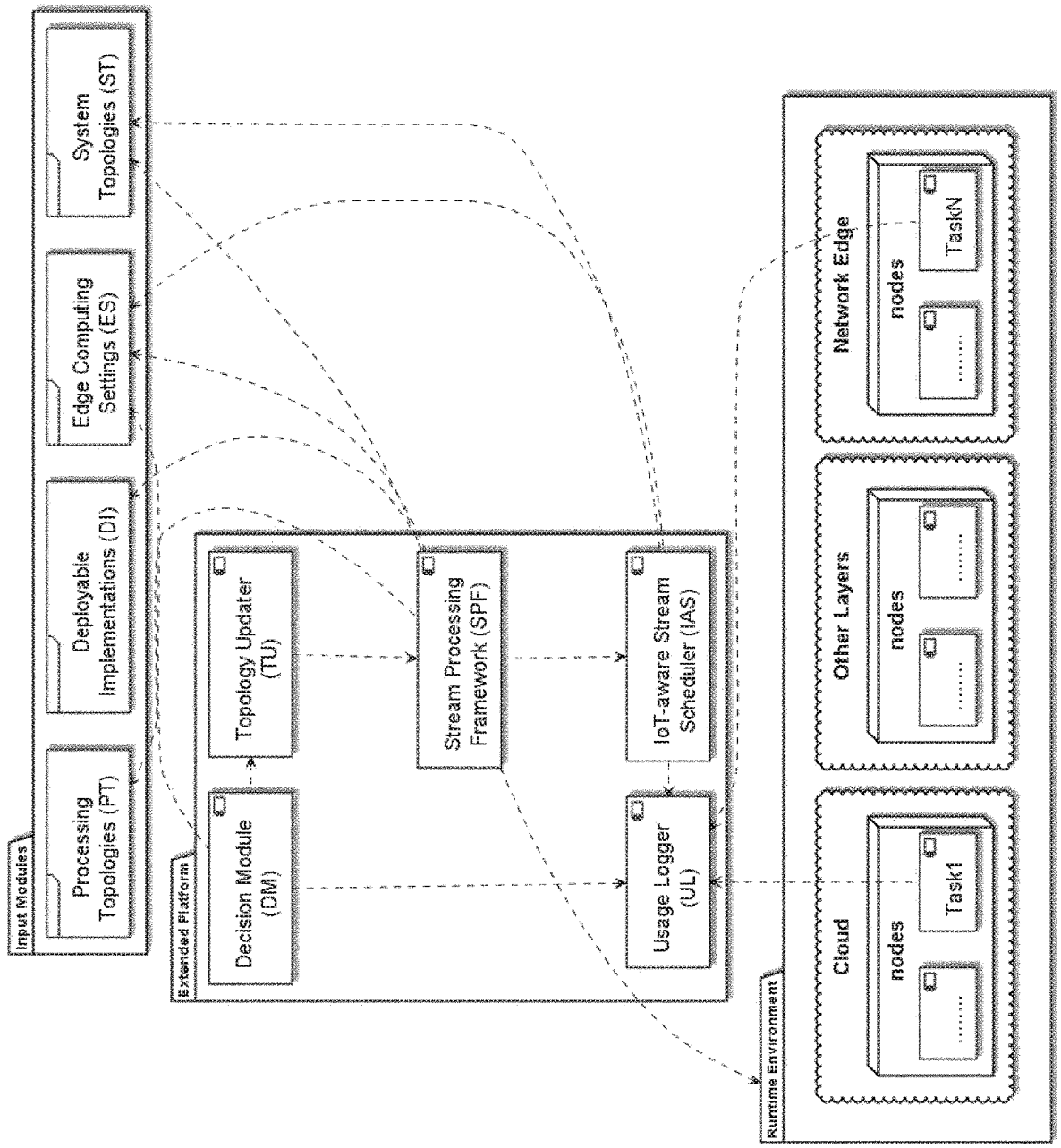
FIG. 6 is a schematic view illustrating a structural overview of a system according to an embodiment of the present invention.

FIG. 6 shows a structural overview of a system according to an embodiment of the present invention. The overview of FIG. 6 is a high-level component diagram with UML2 notation, where all dashed arrows may mean "uses", e.g. "calls", "uses interface of", "retrieves" or similar. The embodiment of FIG. 6 provides a system and a method for deploying and executing stream processing tasks based on the interactions of deployable tasks with actuators, databases and/or external client systems as well as based on the requirements that these entities have and the layer to which these entities belong inside the system, preferably in the context of an IoT system.

According to the embodiment of FIG. 6 these characteristics are consolidated through a combination of formalized "edge computing descriptors" defined by the developer using a respective language and "usage events" computed by a monitoring system based on case-specifically defined metrics. The embodiment is enabled by a system extension of a typical SPF (e.g. as described in the context of FIG. 1 or FIG. 2) which incorporates additional stream processing platform modules, topology/system usage description structures and task deployment and execution algorithms.

The embodiment shown in FIG. 6 has the following major differences to state-of-the-art SPFs such as Apache Storm:

- The SPF of FIG. 6 is extended with additional platform modules—namely Decision Module (DM), Topology Updater (TU), Usage Logger (UL), IoT-aware Stream Scheduler (IAS)—for enabling dynamic observation, detection, and reaction to (IoT-driven) usage patterns and events. The additional modules, as well as the SPF, do not exploit only information that is related to topology settings and node/network characteristics, but also information about the edge computing requirements and other (IoT-driven) settings, e.g. latency-requirements of actuators controlled by a task, location and usage pattern of databases with which a task interacts, and more.
- The embodiment of FIG. 6 provides platform interfaces which are offered by the new platform modules and can be used by actual streaming tasks for communicating aspects of their internal logic and their actual usage back to the platform, e.g. traversal ratio of a task, probability with which output items are produced, probability of raising an event or triggering an actuator, and more. Thus, a backwards interaction from tasks to the stream processing platform is provided.
- The embodiment of FIG. 6 introduces the concept of layers and domains, so that nodes can be categorized in an IoT-driven way, e.g. as Cloud nodes, Edge nodes, or similar. Similar categorization is enabled for users, databases and other modules that are relevant to the tasks of a topology. The layer of these topology-external entities and their role in the IoT landscape can be important for topology execution decisions.

The functionality of the main modules of the suggested SPF system extension according to the embodiment of FIG. 6 is described in the following:

Input modules: Like in state-of-the-art SPFs, the Processing Topologies (PT) are formal descriptions of computation steps (that may be designated as topology components) and their relationships. The components may use data streams that come from other components as input and may produce other data streams as outputs, so that the PT corresponds with a computation graph. The logic of the components can be encapsulated, instantiated multiple times, parallelized, and executed on a distributed network system. Therefore, the developer must also provide for each topology component a Deployable Implementation (DI), i.e. packaged code with the above characteristics that implements the logic of the component. Running instances of this code are then called tasks. The other two input modules used in the system according to the embodiment of FIG. 6 are the Edge Computing Settings (ES) and the System Topologies (ST). In addition to standard SPF-required settings such as the desired number of instances for each component and the desired number of hardware nodes to be used for the execution, the ES contains information about interactions of components with topology-external entities such as actuators or databases, as well as further information about these entities and about computational characteristics of the component. Finally, the ST of the proposed system contains information about the layer, the location, the domain, and other features of the nodes, in addition to their capabilities. Further, it contains similar information for system participants other than the computing nodes, e.g. for databases or actuators.

Extended Platform: The Stream Processing Framework (SPF) has the functionality as described in the context of FIG. 1 or FIG. 2, i.e. it uses the input modules to prepare, deploy, and execute topologies, i.e. their tasks, on a given distributed system. The Usage Logger (UL) receives information about usage aspects of running tasks that are not captured in the PT. This information is received by the UL in the form of single messages or events from a specific list of possible and summarizes them in a system-wide usage report, which is retrieved regularly—e.g. periodically—by the Decision Module (DM). The DM may use this report together with ES information in order to identify potentials for enhancing system performance by triggering a redeployment of a topology. As soon as such a potential has been identified, the DM triggers the Topology Updater (TU). The latter issues commands provided by the SPF in order to kill and then re-deploy the related topology or topologies. After killing the topology and before actually re-deploying it, the SPF contacts the IoT-aware Stream Scheduler (IAS), which responds to the SPF with a deployment that best satisfies the given requirements based on the characteristics and the usage of the components.

Runtime Environment: The runtime environment is a distributed system which, in the embodiment of FIG. 6, comprises Cloud nodes, edge nodes, and nodes of other layers. The layering of the nodes is determined by the ST. The only interface that running tasks have to the platform is this of the UL.

Figure 7:
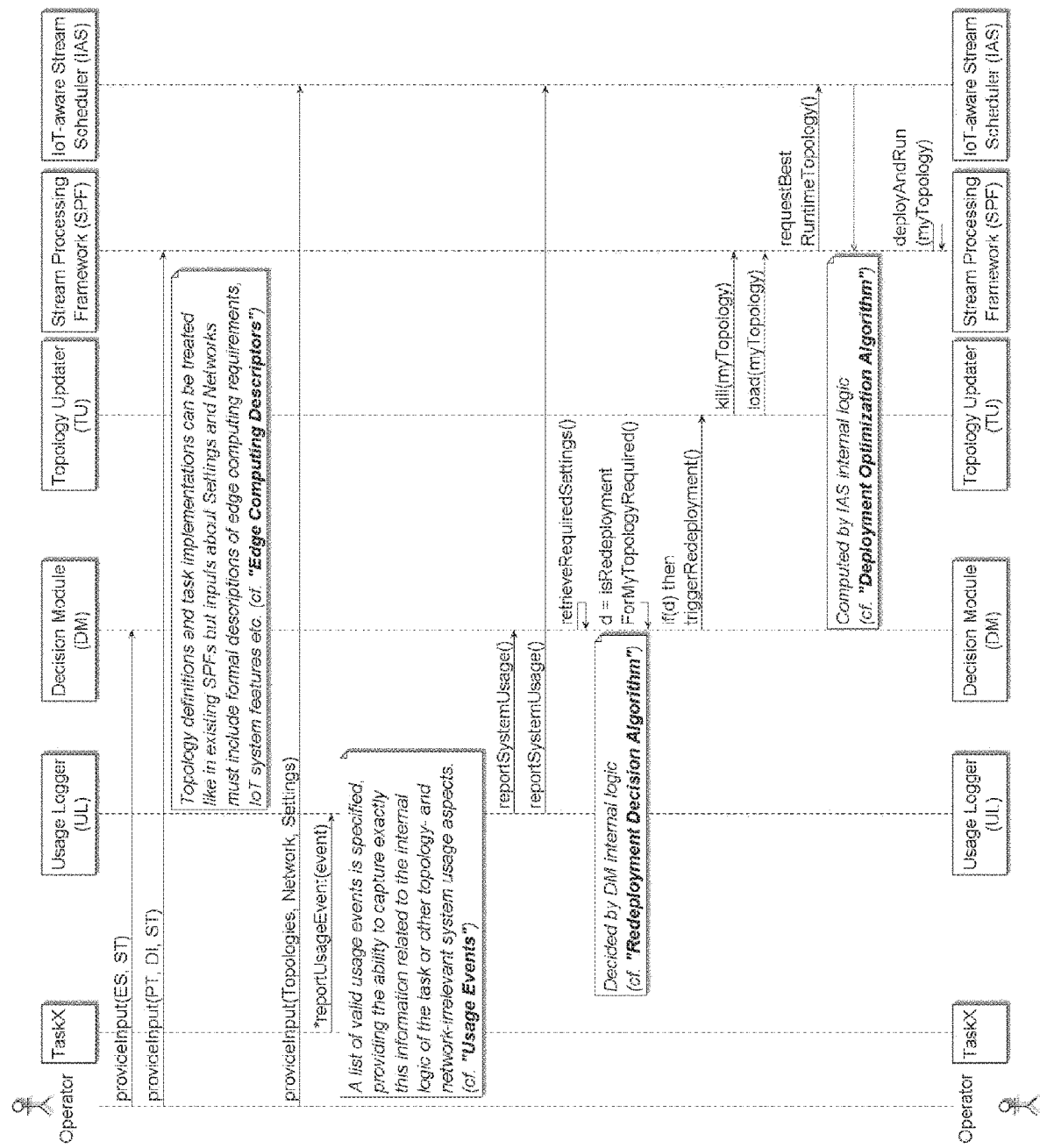
FIG. 7 is a sequence diagram illustrating task execution and task deployment in a method according to an embodiment of the present invention.

FIG. 7 shows a sequence diagram illustrating task execution and task deployment as to a method according to an embodiment of the present invention. FIG. 7 shows the main interactions that occur at runtime as part of the topology adaptation and execution process. The core enabling structures and algorithms—indicated with bold font in FIG. 7—that have a part in it are specified in the following:

Edge Computing Descriptors: These can be included partly in the ES and partly in the ST. In addition to the information that can be retrieved from the topology description, there are three main things (categories of characteristics) that shall determine if a task is relevant to network edge computing and shall be executed at the edge or not. These are:

1. The interfaces of the task with the environment, i.e., control of actuators, direct provision of intermediate results to users, event- or alarm-raising;
2. The characteristics of the databases with which the task interacts;
3. The task computation characteristics, namely its CPU- and data-intensity and security restrictions;

It is noted that there are aspects that might be either preferably developer-provided or preferably monitored at runtime. Therefore, Edge Computing Descriptors may have fields that might be either provided or indicated as "to-be-monitored". This can also smartly tailor and reduce the activity of the system monitor. Examples of such descriptors can be found in the illustrated example of FIG. 8.

Usage Events: Three types of events related to task usage that can be reported by a task back to the platform are specified:

1. Number and types of "recent" interactions with an actuator (note that "recent" is defined by a configurable time interval);
2. Number and types of "recent" database transactions;

3. Probability of topology termination based on the most "recent" task executions. This metric actually shows the ratio with which incoming stream items do not lead to any outgoing stream and it can be important when deciding where to execute the tasks;

The existence of usage events and the utilization of time intervals are important in streaming systems, because not every single interaction can be separately reported or centrally monitored by the platform. In the embodiment of FIG. 7, usage events from different tasks can be collected later, using acceptable periodic intervals, and merged into system-wide usage reports.

Redeployment Decision Algorithm: The redeployment decision algorithm is run periodically in order to determine if the Deployment Optimization Algorithm should be executed in order to re-deploy the topology. The generic steps implemented by the algorithm are:
1. Compare the current deployment with an "optimal deployment";
2. Find the tasks that have different placements in these two deployment;
3. Evaluate the requirements that are violated by the placement of these tasks and decide if the total violation is big enough to justify a re-deployment;

The specifics of these generic steps are customizable. For example as follows:
The Redeployment Decision Algorithm assumes that the optimal deployment is the one that would be enforced by the Deployment Optimization Algorithm;
Violations of edge computing requirements are not quantified or weighted, just counted;
n categories of violations are defined, $\{t_1, \ldots, t_n\}$ are thresholds that indicate up to how many violations of each category can be tolerated before the Redeployment Decision Algorithm decides that re-deployment should be considered, and x is the amount of thresholds that need to be exceeded so that re-deployment is triggered. Example categories of violations are: "task that controls critical actuator of area X is executed in area Y", "task with high CPU intensity and no edge computing requirements is run at the edge", etc., and they can be detected based on the current deployment and the Edge Computing Descriptors.

Under these assumptions, the pseudocode of a Redeployment Decision Algorithm for this simple case may be specified as follows:

```
/*
Input:
currentDeployment: A list of <task, node> entries.
thresholds: A list with one threshold for each violation category.
maxViolations: Maximum tolerable amount of violations.
Output:
decision:    "true" if re-deployment is required, "false" otherwise
*/
// Assuming that the optimal deployment is the one that would
be enforced by the Deployment Optimization Algorithm and that
the latter is accessible here
optimalDeployment = DeploymentOptimizationAlgorithm.
getOptimalDeployment( );
for each task in currentDeployment
if (optimalDeployment.getNode(task) !=
currentDeployment.getNode(task))
misplacedTasks.add(task);
end if
end for each
for each task in misplacedTasks
for each violationCategory
if (task.violates(violationCategory))
```

-continued

```
violationsCount(violationCategory)++;
end if
end for each
end for each
for each violationCategory
if (violationsCount(violationCategory) > thresholds(violationCategory))
violatedCategoriesCount++;
end if
end for each
if (violatedCategoriesCount > maxViolations)
decision = true;
else
decision = false;
end if
return decision;
```

It is noted that much more complex versions are possible, while the Redeployment Decision Algorithm does not necessarily need (or want) to use, know, or have access to the logic of the Deployment Optimization Algorithm. The two algorithms may run in independent modules and they might use different criteria or have different degrees of complexity.

Deployment Optimization Algorithm: This algorithm computes and enforces the exact deployment, i.e. the number of tasks, their allocation to nodes, and their communication links that best satisfies the requirements of the Edge Computing Descriptors, given the current Usage Events, according to a customizable logic. In fact, similar principles might be followed as in the Redeployment Decision Algorithm, e.g. avoidance of requirements violations.

In a further embodiment of the present invention an implementation as extension of Apache Storm is provided. Apache Storm is a state-of-the-art stream processing framework. This embodiment may assume technical background knowledge with regard to Apache Storm that can be obtained from the non-patent literature of Quinton Anderson: Storm real-time processing cookbook, Packt Publishing Ltd, 2013. The following explanation describes in Apache Storm terms how the main parts of the embodiment may be implemented. Most importantly, it includes configuration files used in an implemented prototype, thus supporting a better understanding of the invention and/or embodiments thereof.

The implementation by using Apache Storm is merely an example. Apache Storm can provide a solid core around which it is possible to implement the main parts of an embodiment according to the present invention. This means adding modules to the Apache Storm library, developing custom schedulers, using additional scripts, introducing various configuration files and system metrics, and more. More concretely:

The PT and the DI can be realized with the standard Apache Storm mechanisms, i.e. using the Apache Storm library and implementing classes that extend the BaseRichBolt and BaseRichSpout classes, as well as using the TopologyBuilder to specify the deployment settings and the relationships of the components.

The ES and the ST are partly realized by specifying JSON configurations for all spouts and bolts according to a template and providing a JSON reader that transforms them into Map objects which can be provided to the Config and TopologyBuilder objects of Storm. The rest of the realization of ES and ST relies on an extended version of storm.yaml (a node-scope configuration used by Storm). A configuration template is illustrated by FIG. 8. A version of an extended storm.yaml is illustrated by FIG. 9.

Getting down to the platform, Apache Storm itself is the SPF while the UL may be implemented and provided as a jar file which must be added to the Apache Storm library (note that it is also declared inside the storm.yaml configuration of FIG. 9. The DM is shipped as part of the UL, though more complex implementations might need to separate them. Finally, the IAS is a pluggable Apache Storm scheduler, i.e., another jar that has been developed by extending Storm's Scheduler and placed in the "lib" folder of Storm, while the TU is an OS-specific script which executes commands of the "storm" tool in order to kill and deploy topologies. The Deployment Optimization Algorithm is part of the internal logic of the IAS, while the Usage Events are implemented by exploiting the Storm Metrics concept.

To achieve the target Runtime Environment, the Apache Storm platform has been installed onto various networked heterogeneous devices with different capabilities, while the layering of the devices and the involved entities has to be specified in the previously introduced configuration files (cf. FIG. 8 and FIG. 9 remember that each node has its own storm.yaml).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for supporting stream processing framework functionality in a stream processing system, the stream processing system including one or more input modules, a stream processing platform, and computing nodes, the method comprising:
deploying, by the stream processing platform using the input modules, tasks of at least one stream processing topology on the computing nodes based on both stream processing topology-related information and stream processing topology-external information;
preparing and executing, by the stream processing platform using the input modules, the tasks of the at least one stream processing topology on the computing nodes; and
performing a re-deployment decision algorithm in order to determine if a current deployment of running tasks is improvable,
wherein the re-deployment decision algorithm comprises:
comparing the current deployment of the tasks with a predetermined optimal deployment of the tasks;
determining deployed tasks having different placements in the current deployment of the tasks than in the predetermined optimal deployment of the tasks;
determining violations of one or more predefined requirements, wherein the violations are produced by the placements of the deployed tasks in the current deployment of the tasks.

2. The method according to claim 1, wherein the stream processing topology-related information includes stream processing topology settings, system characteristics, network link characteristics, and/or computing node characteristics.

3. The method according to claim 1, wherein the stream processing topology-external information includes information on interactions between the tasks and topology-external entities.

4. The method according to claim 1, wherein the stream processing topology-external information includes information about characteristics and/or requirements of topology-external entities.

5. The method according to claim 4, wherein the characteristics and/or requirements of the topology-external entities include their layer, location, domain, and/or capabilities.

6. The method according to claim 3, wherein the topology-external entities include data sources, databases, actuators, external client systems, and/or users.

7. The method according to claim 1, wherein edge computing requirements are involved in the deployment of the tasks on the computing nodes, wherein the edge computing requirements are considered by implementing edge computing descriptors that comprise a characteristic selected from one or more than one of the following categories of characteristics:
interfaces of a task with topology-external entities;
characteristics of a database with which a task interacts; and
computational characteristics of a task, in particular CPU-intensity, data-intensity and/or security restrictions of a task.

8. The method according to claim 1, wherein backward interaction is performed from the tasks to the stream processing platform in order to communicate information about task internal logic and/or task topology-external usage.

9. The method according to claim 1, wherein a re-deployment of running tasks is triggered based on an amount of violations determined.

10. The method according to claim 1, wherein a re-deployment of running tasks is triggered if the amount of violations determined is higher than a predefined threshold.

11. The method according to claim 1, wherein determined violations are classified in several categories, wherein the determined violations of each category are compared with a predefined threshold for each category in order to determine if a total violation of all categories is high enough to justify triggering of a re-deployment of running tasks.

12. The method according to claim 1, wherein the topology-external information is consolidated by a combination of edge computing descriptors and usage events.

13. The method according to claim 1, wherein usage events related to task topology-external usage are reported back by the tasks to the stream processing platform, and wherein the usage events comprise:
number and/or types of interactions with an actuator that occur within a predetermined time interval;
number and/or types of database transactions that occur within a predetermined time interval; and/or
probability of topology termination based on task executions within a predetermined time interval.

14. A method for supporting stream processing framework functionality in a stream processing system, the stream processing system including one or more input modules, a stream processing platform, and computing nodes, the method comprising:
deploying, by the stream processing platform using the input modules, tasks of at least one stream processing topology on the computing nodes based on both stream processing topology-related information and stream processing topology-external information;
preparing and executing, by the stream processing platform using the input modules, the tasks of the at least one stream processing topology on the computing nodes,
wherein usage events related to task topology-external usage are reported back by the tasks to the stream processing platform, and
wherein the usage events comprise:
number and/or types of interactions with an actuator that occur within a predetermined time interval;
number and/or types of database transactions that occur within a predetermined time interval; and/or
probability of topology termination based on task executions within a predetermined time interval.

15. The method according to claim 14, wherein the stream processing topology-related information includes stream processing topology settings, system characteristics, network link characteristics, and/or computing node characteristics.

16. The method according to claim 14, wherein the stream processing topology-external information includes information on interactions between the tasks and topology-external entities.

17. The method according to claim 16, wherein the topology-external entities include data sources, databases, actuators, external client systems, and/or users.

18. The method according to claim 14, wherein the stream processing topology-external information includes information about characteristics and/or requirements of topology-external entities.

19. The method according to claim 18, wherein the characteristics and/or requirements of the topology-external entities include their layer, location, domain, and/or capabilities.

20. A system for supporting stream processing framework functionality, the system comprising:
one or more input modules;
a stream processing platform; and
computing nodes,
wherein the stream processing platform is configured to use the input modules to deploy tasks of at least one stream processing topology on the computing nodes based on both topology-related information and topology-external information,
wherein the stream processing platform is further configured to use the input modules to prepare and execute the tasks of the at least one stream processing topology on the computing nodes, and
wherein the stream processing platform is further configured to perform a re-deployment decision algorithm in order to determine if a current deployment of running tasks is improvable,
wherein the re-deployment decision algorithm comprises:
comparing the current deployment of the tasks with a predetermined optimal deployment of the tasks,
determining deployed tasks having different placements in the current deployment of the tasks than in the predetermined optimal deployment of the tasks, and
determining violations of one or more predefined requirements, wherein the violations are produced by the placements of the deployed tasks in the current deployment of the tasks.

* * * * *